United States Patent Office 3,752,758
Patented Aug. 14, 1973

3,752,758
METHOD OF SEPARATING SOLID FROM LIQUIDS
Ahmad M. El-Hindi, Ridge Road, Fabius, N.Y. 13063, and Ralph G. Jaeggli, Sky High Road, Tully, N.Y. 13159
Filed July 15, 1971, Ser. No. 162,771
Int. Cl. B01d *12/00*
U.S. Cl. 210—21       3 Claims

ABSTRACT OF THE DISCLOSURE

A method of removing solid contaminants from a liquid wherein the solid particles have a weight-to-buoyancy ratio approaching unity. The contaminated liquid is placed in a container with a significantly heavier or lighter liquid, forming an interface. The two liquids are mutually immiscible and are forced together to be thoroughly interspersed with one another and then allowed to separate again. The solid particles are thereby wetted to some extent by the initially clean liquid and tend to remain therein after the liquids separate, thus being removed from the initially contaminated liquid.

---

This invention relates to methods of removing solid particles suspended in liquids and is particularly useful in removing solids having a weight to buoyancy ratio approaching unity with respect to a liquid in which they are suspended.

Solid contaminants are mechanically separated from liquids by various means of removal after floating to the top or settling to the bottom. Means may also be employed to speed up the process of flotation or settling. The removal of contaminants becomes a problem, however, when the weight to buoyancy ratio approaches unity and filtration, straining, or the like, are impractical or undesirable.

Accordingly, it is a principal object of the present invention to provide a novel and efficient method of removing solid contaminants from a liquid where the weight to buoyancy ratio of the solids is at or near unity.

Another object is to provide a method of removing solid particles from a liquid by transferring them to either a heavier or a lighter liquid in which they will more readily settle or float.

A still further object is to provide a method of separating solid particles from a liquid, wherein such particles neither float nor settle, by means of easily and inexpensively constructed apparatus.

Other objects of the invention will in part be obvious and will in part appear hereinafter.

The invention accordingly comprises the several steps and relation of one or more of such steps with respect to each of the others thereof, which will be exemplified in the method hereinafter disclosed, and the scope of the invention will be indicated in the claims.

Figure 1:
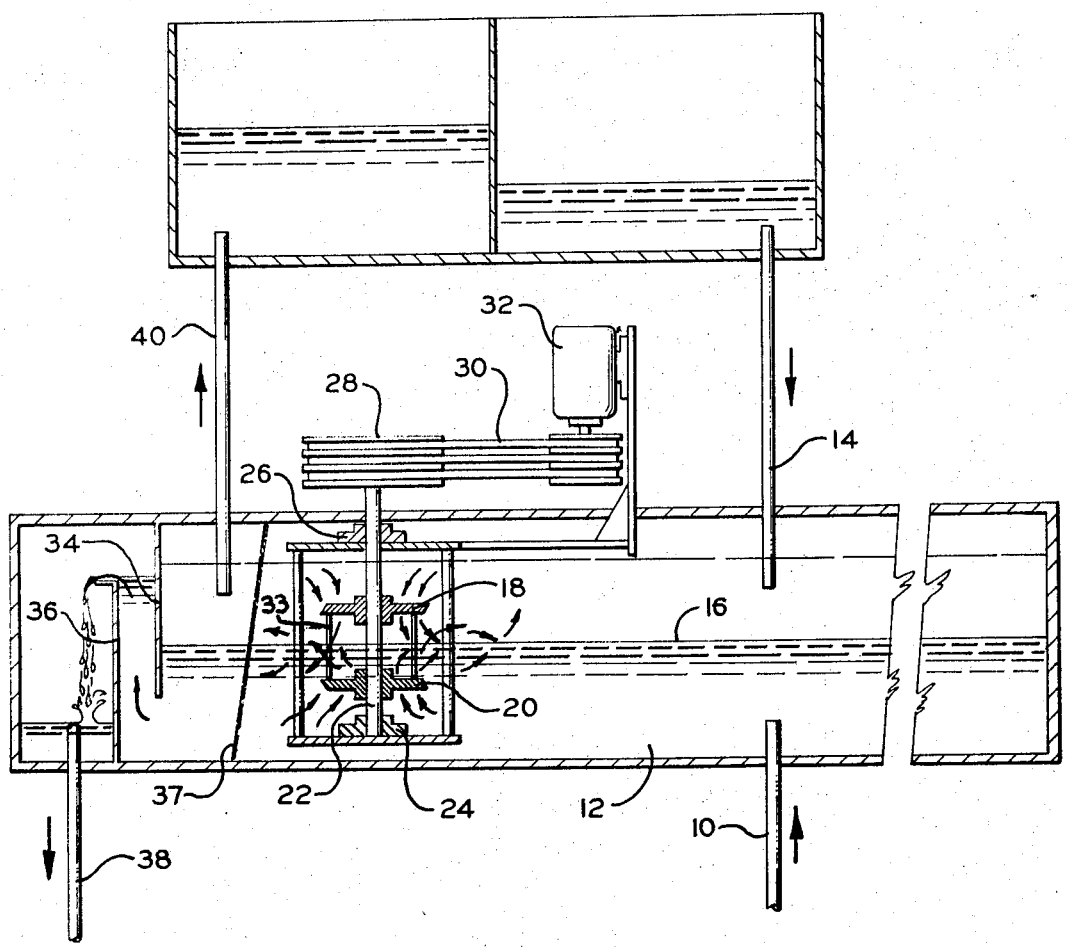
Figure 2:
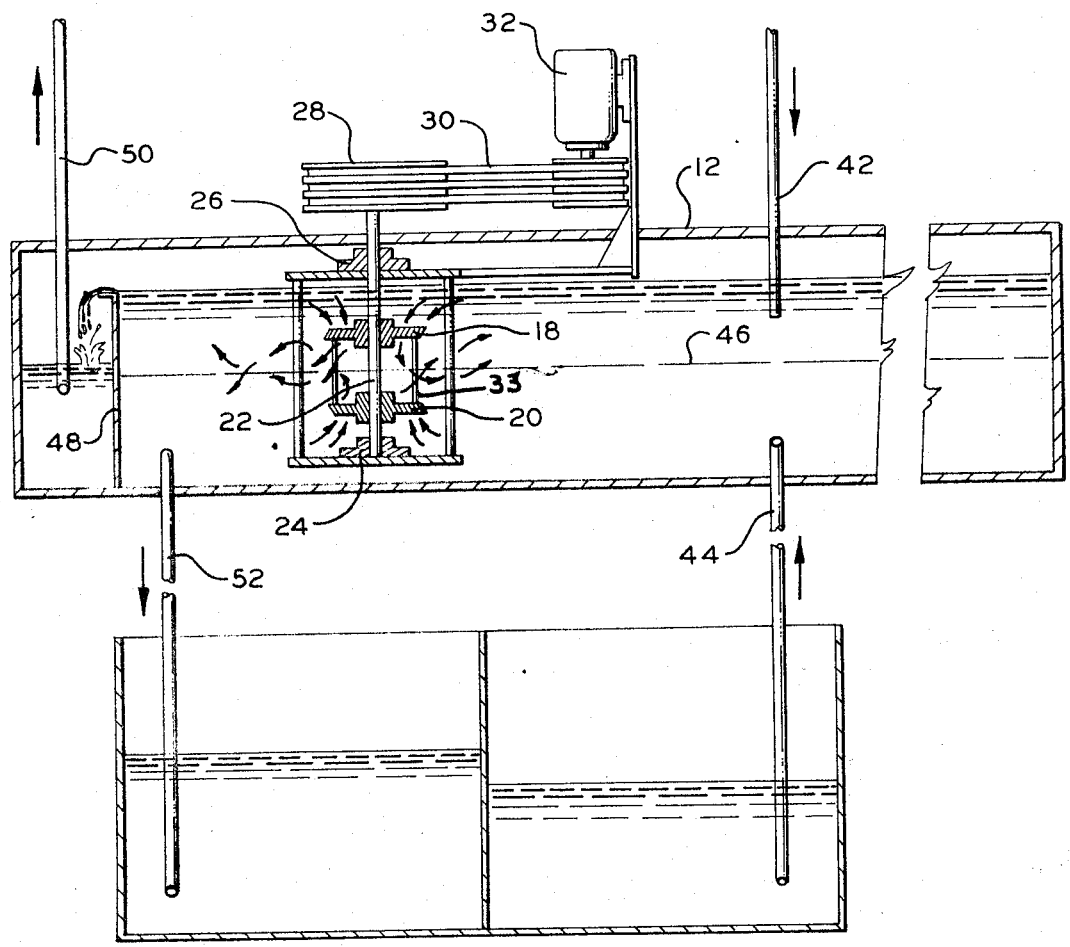

For a fuller understanding of the nature and objects of the invention reference should be had to the following detailed description taken in connection with the accompanying drawings, in which:

FIG. 1 is a somewhat diagrammatic, elevational view illustrating a first embodiment of the invention; and FIG. 2 is a like view, showing operation of the invention in a second embodiment.

The problem with which the invention deals is that of a liquid contaminated by solid particles having a weight to buoyancy ratio which precludes conventional methods of separation employing floating or settling of the particles. For example, the settling rate of small paper particles in water is usually much too slow and would require much too large a storage area to be practical. However, if the particles could be transferred from the water to another liquid significantly heavier or lighter than water, the particles would tend to float or settle more readily in the secondary liquid, thus greatly reducing the mechanical problems of collecting the particles and removing them from the carrier liquid.

Referring now to FIG. 1, the initially contaminated liquid, e.g., water, is supplied through inlet 10 to tank 12. A secondary liquid, having a specific gravity significantly lower than that of the contaminated liquid, e.g., kerosene, is admitted to tank 12 through inlet 14. The light, initially clean liquid and the heavier, initially dirty liquid form an interface, indicated at 16, in tank 12.

A mixing unit comprising a pair of impellers 18 and 20, carried on a common shaft 22, is suitably mounted on tank 12. The two impellers are arranged on opposite sides of liquid interface 16, substantially equidistant therefrom, and have blades formed to direct liquid toward one another when rotated in the same direction. Shaft 22 is journaled in conventional bearing means at 24 and 26, and carries pulley 28 on its outer end. One or more belts 30 connect pulley 28 to the output shaft of electric motor 32, thereby providing means for rotating impellers 18 and 20 at a desired speed. Conventional control means (not shown) may be provided for selectively varying the speed of motor 32, if desired. The blades of impellers 18 and 20 are preferably connected by rods or tubes 33 which assist in breaking up the liquids to achieve a more thorough mix.

The pumping action of the two impeller blades, one immersed in each of the two liquids, forces the two liquids to be mixed thoroughly, and they then flow outwardly from between the impellers, as indicated by the arrows, and separate again. When the liquids are mixed the particles are at least partially wetted by the lighter liquid, thus tending to assume the weight of the lighter liquid and reducing the weight-to-buoyancy ratio with respect to the heavy liquid. Therefore, once the liquids have been thoroughly mixed the particles will tend to remain in the lighter liquid since they are now light enough to float in the heavy liquid. The latter may then be allowed to drain off, passing under baffle 34 which extends from the top of tank 12 below interface 16, and flowing over wall 36 which extends upwardly from the bottom of tank 12 to approximately the same height, but slightly below the level of the upper, lighter liquid. It may be desirable in some applications to make the height of wall 36 adjustable. A coagulation or coalescing screen, indicated by dotted lines 37, may be included, if desired. This will assist in returning any lighter liquid which has been mixed into the heavy liquid back to the upper level. The heavy liquid, now essentially free of contaminating particles, is drawn off through outlet 38, and the lighter liquid which now carries the particles is pumped out through outlet 40. The particles will, of course, tend to settle in the lighter liquid and may therefore be removed by conventional means.

In FIG. 2 an arrangement is shown for transferring particles from the lighter to the heavier of two liquids. The motor, pulley and impellers may be the same as in the FIG. 1 embodiment, and the same reference numerals are therefore used in FIG. 2. The lighter liquid, initially carrying the contaminating particles in suspension, is admitted to tank 12 through inlet 42 and the heavier, initially clean liquid through inlet 44. The liquids form an interface at 46 and are mixed by the action of impellers 18 and 20. The particles in the mixed liquids become heavier, tending to assume some of the weight of the heavy liquid when wetted thereby. Since the weight-to-buoyancy ratio of the particles with respect to the lighter liquid was at or near unity when the contaminated lighter liquid was admitted to the tank, with any increase in weight the particles will remain below interface 46. Thus, the lighter liquid may be allowed to flow over wall 48, extending upwardly from the bottom of tank 12 to the upper liquid level, and pumped off through outlet 50 or drained. The heavier liquid, which now contains the particles, is removed from the tank through outlet 52. The particles will tend to float in the heavier liquid and may therefore be removed by conventional means.

The flow rates of the two liquids in and out of tank 12 are controlled as necessary to achieve the desired degree of particle removal from the initially contaminated liquid. It may sometimes be desirable to pass the initially contaminated liquid through the process two or more times to increase its purity. The size and speed of rotation of the impellers will also be governed by the particular liquids being operated on, the nature of the particles to be transferred, and other process parameters. For example, in transferring paper particles from water to kerosene, impellers having a one foot radius rotated at 400 r.p.m. provide satisfactory particle transfer.

Another useful application of the invention is in the field of machinery operations where one liquid is used to cool and lubricate the tool and workpiece, and another is used to lubricate the moving parts of the machinery. The first-mentioned liquid commonly is a mixture of water and a water-soluble oil, while the second is a machine oil which is non-soluble or miscible with water. The water-oil mixture, after being sprayed over the workpiece in the area of tool contact, is drained off and recirculated for repeated use. Droplets of the machine oil may get into the water-oil mixture, and are commonly referred to as 'tramp" oil. These droplets, although normally lighter than the water-oil mixture, may contain contaminating solids such as dirt and very fine metal particles, thereby increasing their weight and their tendency to remain suspended in the oil-water mixture. The tramp oil may be separated according to the present invention by placing the contaminated water-oil mixture in tank 12 as the heavy liquid and a quantity of lighter, initially clean oil in the top of the tank. As the liquids are forced together by the impellers and then separate, the tramp oil will tend to remain at or above the interface, retaining the solid particles. Thus, the water-oil mixture drained from tank 12 will be essentially clean and ready for re-use.

Still another example is the separating of water droplets containing water-wettable solids from perchlorethylene. The latter liquid, having a specific gravity of about 1.6, is normally easily separable from water but the solid particles in the small droplets of water increase the weight-to-buoyancy ratio to the point of making separation by conventional means difficult and impractical. The method of the present invention may be used to effect separation in the manner previously explained, using initially clean water as the secondary liquid.

It is thus evident that the invention is suited not only for removing solid particles suspended in a liquid, but also droplets of another immiscible liquid entrapped in the first liquid and not readily separable either because of solid particles in the droplets or of close specific gravities. It is necessary, of course, that the initially dirty liquid and the secondary liquid, to which the particles are to be transferred, be immiscible with respect to one another and have different specific gravities.

What is claimed is:

1. A method of removing suspended contaminants from a carrier liquid wherein the weight to buoyancy ratio of said contaminants with respect to said carrier liquid is substantially unity comprising:
   (a) placing said carrier liquid in a common container with a secondary liquid, said carrier and secondary liquids having significantly different specific gravities and being substantially mutually immiscible, with interface therebetween;
   (b) arranging a pair of opposing impellers on opposite sides of the interface and rotating the impellers to force the two liquids into admixture between the impellers;
   (c) mixture of the two liquids being sufficiently complete that the contaminants in said carrier liquid are wetted by said secondary liquid sufficiently to change the weight to buoyancy ratio thereof with respect to said carrier liquid to other than substantially unity;
   (d) said container being of sufficient lateral dimensions to allow the mixed liquids to flow outwardly from between the impellers and separate from one another by gravity; and
   (e) separately removing the two liquids from the container after mixture, wetting of the contaminants by the secondary liquid, and separation of said liquids.

2. The invention according to claim 1 wherein said contaminants are paper particles and said carrier liquid is water.

3. The invention according to claim 1 wherein said contaminants are droplets of a liquid other than the carrier liquid and said droplets contain solid particles.

References Cited

UNITED STATES PATENTS

| | | | |
|---|---|---|---|
| 1,236,746 | 8/1917 | Nonnenbruch | 210—511 X |
| 1,682,939 | 9/1928 | Schwab et al. | 210—511 X |
| 2,029,690 | 2/1936 | Wilson | 210—511 X |
| 2,218,080 | 10/1940 | Bottaro | 210—511 X |

JOHN ADEE, Primary Examiner

U.S. Cl. X.R.

210—83, 511